United States Patent [19]

Bellarbre et al.

[11] 3,966,276

[45] June 29, 1976

[54] AUTOMATIC PLAY TAKE-UP JOURNAL BUSHINGS

[75] Inventors: Raymond Bellarbre; Marcel Legavre, both of Boulogne-Billancourt, France

[73] Assignees: Regie Nationale des Usines Renault, Boulogne-Billancourt; Automobiles Peugeot, Paris, both of France

[22] Filed: Jan. 9, 1975

[21] Appl. No.: 539,806

[30] Foreign Application Priority Data

Jan. 11, 1974 France .............................. 74.01067

[52] U.S. Cl. .............................................. 308/238

[51] Int. Cl.[2] .......................................... F16C 33/00

[58] Field of Search ................ 308/237 R, 238, 2 G; 16/2

[56] References Cited

UNITED STATES PATENTS

| | | | |
|---|---|---|---|
| 2,884,283 | 4/1959 | Korol et al. | 308/238 |
| 3,033,624 | 5/1962 | Biesecker | 308/238 |
| 3,438,686 | 4/1969 | Stone | 308/238 |
| 3,829,184 | 8/1974 | Chevret | 308/26 X |

*Primary Examiner*—Robert R. Song
*Assistant Examiner*—Gene A. Church
*Attorney, Agent, or Firm*—Fleit & Jacobson

[57] ABSTRACT

The bushing comprising a substantially cylindrical portion at one end and a frustoconical resilient portion at the other end and, at said other end, a retaining flange, has angularly spaced radial and longitudinal slots formed in said other portion, and the flange segment formed by said slots are either disposed on a common circle or of helical or substantially helical configuration like the wings of a fan-washer.

2 Claims, 5 Drawing Figures

Fig- 1
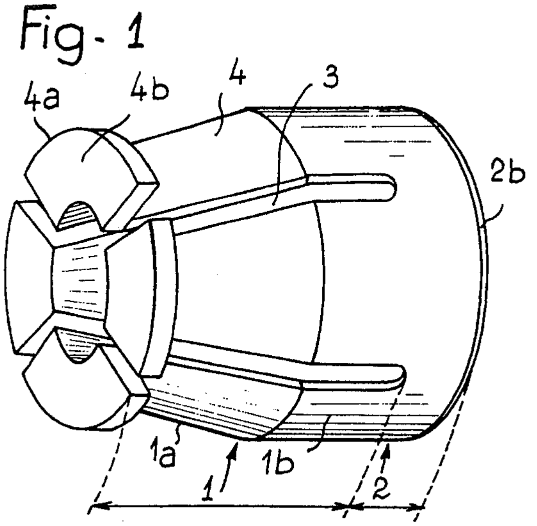
Fig- 2
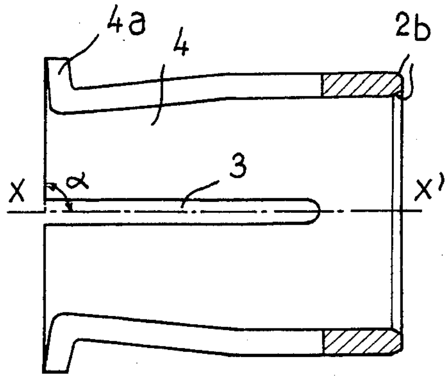
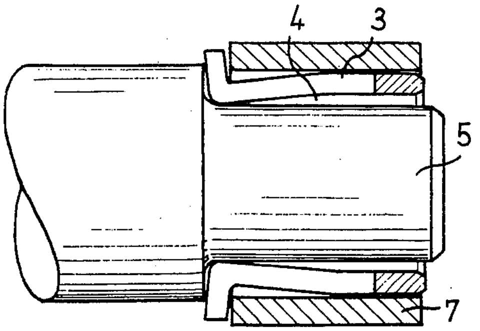
Fig- 3
Fig- 4
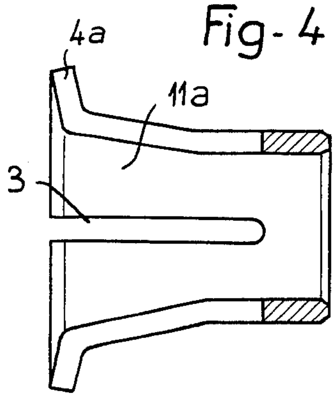
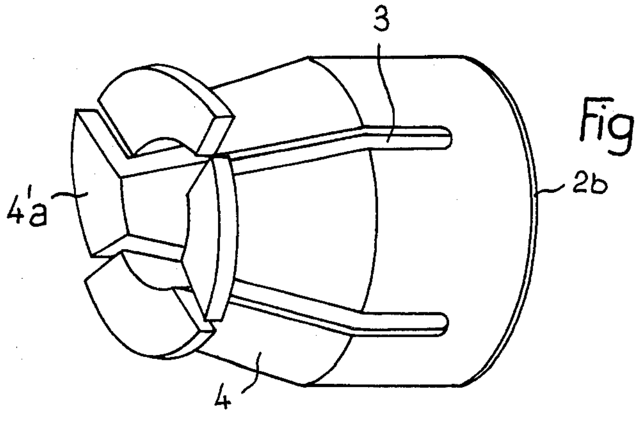
Fig- 5

AUTOMATIC PLAY TAKE-UP JOURNAL BUSHINGS

The present invention relates in general to automatic play take-up bushings of the type intended more particularly for joints or bearings of mechanisms operating under medium or low loads.

In a prior U.S. Pat. No. 3,829,184, there is described a bushing adapted to receive a pin, shaft or trunnion of a mechanism, which bushing is enclosed in a bearing and comprises a retaining flange, and at least one resilient portion adapted to undergo a radial distortion as a consequence of the pressure exerted at its ends by the shaft or trunnion, and another, substantially distortion-free portion, said resilient portion comprising in turn at least one frustoconical axial section having formed therein at least three radial longitudinal slots, the shape of this resilient portion being adapted to be altered by said shaft or trunnion to provide at least two opposite inclined frustoconical sections of which the split elements having a common base diverge and bear against said bearing or trunnion while the sections remote from said retaining flange diverge from one another while remaining in bearing contact with said bearing or trunnion.

However, it appeared that the bushing described in the U.S. Pat. No. 3,829,184, though quite satisfactory as far as the suppression of radial play is concerned, was unable to eliminate axial play and, consequently, the undesired noise resulting therefrom which, considering the specific application thereof to the automobile industry, are caused by body jolts and vibration.

To avoid this inconvenience it is customary to associate with the bushing an addition washer of corrugated configuration, adapted to provide the desired additional effect of axial play take-up.

Now the present invention relates to a bushing of the type described in the U.S. Pat. No. 3,829,184 designed with a view to take up or remove automatically both radial and axial plays, without resorting to an additional washer.

The bushing according to this type is characterized essentially in that said stop flange of the bushing is disposed at the end of said frustoconical resilient portion and is split longitudinally by slots identical to those of said resilient portion, the bearing surface of said flange being enabled to occupy in the regard to a reference axis of said bushing a sloped position when said bushing is strung on its pin or trunnion, the slope and the resiliency of said flange permitting to eliminate axial plays when definitively fitted said bushing in a bearing.

Other features characterising this invention will appear as the following description proceeds with reference to the attached drawing in which three typical forms of embodiment are illustrated diagrammatically by way of example.

In the drawing:

FIG. 1 is a perspective view of a bushing according to this invention;

FIG. 2 is an axial section of the bushing shown in Fig. 1;

FIG. 3 is another axial section of the bushing in which a trunnion has been fitted;

FIG. 4 is an axial section showing a modified form of embodiment with a reverse arrangement of the frustoconical end portion, and FIG. 5 is another modified form of embodiment shown in perspective view, with a retaining flange having its various segments twisted to a helical or substantially helical configuration.

Referring first to FIGS. 1 and 2 of the drawing, it will be seen that the bushing according to this invention comprises two portions, i.e. a first resilient portion 1 consisting of a first frustoconical section 1*a* having a relatively pronounced taper angle and a second frustoconical section 1*b* having a relatively moderate taper angle or, if desired, a cylindrical configuration, and a second rigid cylindrical portion 2 ending with a double bevel 2*b*.

The first portion 1 comprises at least three longitudinal slots 3 dividing this portion 1 into segments 4 imparting a certain radial elasticity to the bushing; in the example illustrated, four such slots 3 are provided at spaced angular intervals.

A retaining flange 4*a* is formed at the outer end of the resilient frustoconical portion 1*a*. This flange 4*a* is also split by the slots 3 and consists therefore of annular segments. The outer faces 4*b* of these segments, when the bushing is fitted for operation, are inclined in relation to the longitudinal axis X—X′ of the bushing, the angle $\alpha$ being slightly greater than 90°.

Since the flange 4*a* consists of the same resilient material as the frustoconical portion 1*a* of the bushing, when said flange abuts the edges of the bushing housing in the operative position of the bushing, i.e. in a bearing 7, and has a trunnion or shaft 5 fitted therein (see FIG. 3), it permits of taking up any axial play while any radial play is absorbed by the radial distortion of the bushing as indicated in the U.S. Pat. No. 3,829,184.

In a modified form of embodiment similar to the one illustrated in said prior U.S. Pat. No. 3,829,184 and illustrated in FIG. 4, the resilient frustoconical portion 11*a* flares out towards the flanged end 4*a*.

In another modified form of embodiment illustrated in FIG. 5, the segments 4′*a* of the flanged bushing end have a helical or substantially helical configuration imparting to the retaining flange the appearance of a fan-washer, thus increasing its resiliency.

Although specific forms of embodiment of this invention have been described hereinabove and illustrated in the attached drawing, it will readily occur to those skilled in the art that various modifications and changes may be brought thereto without departing from the scope of the invention as set forth in the appended claims.

What is claimed as new is:

1. A bushing for receiving a pin or trunnion of a mechanism subjected to medium or moderate loads and for force-fitting into a bearing comprising, a body having an annular cross-sectional shape and an equal radial thickness throughout the length thereof for accommodating the pin or trunnion, a radially extending, outwardly directed flange on one end of said body having at least one longitudinally extending resilient portion adjacent said one end for radial outward movement by the pin or trunnion accommodated within the body and at least one longitudinally extending substantially rigid portion adjacent the other end of said body, said resilient body portion comprising at least one longitudinally extending portion of frusto-conical shape, said frusto-conical portion having a plurality of circumferentially spaced, longitudinally extending slots, said slots extending through said flange to define a plurality of resilient segments each provided at their outer ends with a portion of said flange, said flange portions being angularly disposed with respect to the longitudinal axis of said body for yielding engagement with one end of the bearing in which the bushing is mounted and with a cooperating surface on the pin or trunnion accommodated within said body to thereby eliminate axial movement between the bearing and the pin or trunnion.

2. A bushing in accordance with claim 1 wherein said flange portions are of substantial helical shape in the fashion of a fan-washer.

* * * * *